Nov. 1, 1966   B. W. O. DICKINSON III   3,282,087
APPARATUS FOR GENERATING ULTRASONIC WAVES
Filed Dec. 19, 1962

INVENTOR.
Ben Wade Oakes Dickinson III
BY
Flehr and Swain
ATTORNEYS

United States Patent Office 3,282,087
Patented Nov. 1, 1966

3,282,087
APPARATUS FOR GENERATING ULTRA-
SONIC WAVES
Ben Wade Oakes Dickinson III, 3290 Jackson St.,
San Francisco, Calif.
Filed Dec. 19, 1962, Ser. No. 245,862
3 Claims. (Cl. 73—71.5)

This invention relates to apparatus for generating ultrasonic waves and more particularly to such apparatus for use in nondestructive testing or system performance monitoring.

In many applications for ultrasonic waves, it may be desirable to provide ultrasonic waves which have a relatively high intensity and particularly intensities which are much greater than those which can be obtained with piezoelectric techniques. There is, therefore, a need for a new and improved method and apparatus for generating ultrasonic waves.

In general, it is an object of the present invention to provide apparatus for generating ultrasonic waves which have a high intensity.

Another object of the invention is to provide apparatus of the above character in which the ultrasonic waves cover a wide frequency spectrum.

Another object of the invention is to provide apparatus of the above character in which the ultrasonic waves generated are distributed throughout the wide frequency spectrum.

Another object of the invention is to provide apparatus of the above character which is relatively simple.

Another object of the invention is to provide apparatus which because of the long time between the initial transmitted pulse (main bang) and the received flaw indication pulse and the lack of a requirement for repetitive signals makes possible the use of impulsively generated sound covering a wide frequency band.

Additional objects and features of the invention will appear from the following description in which the preferred embodiments are set forth in detail in conjunction with the accompanying drawings.

Figure 1:
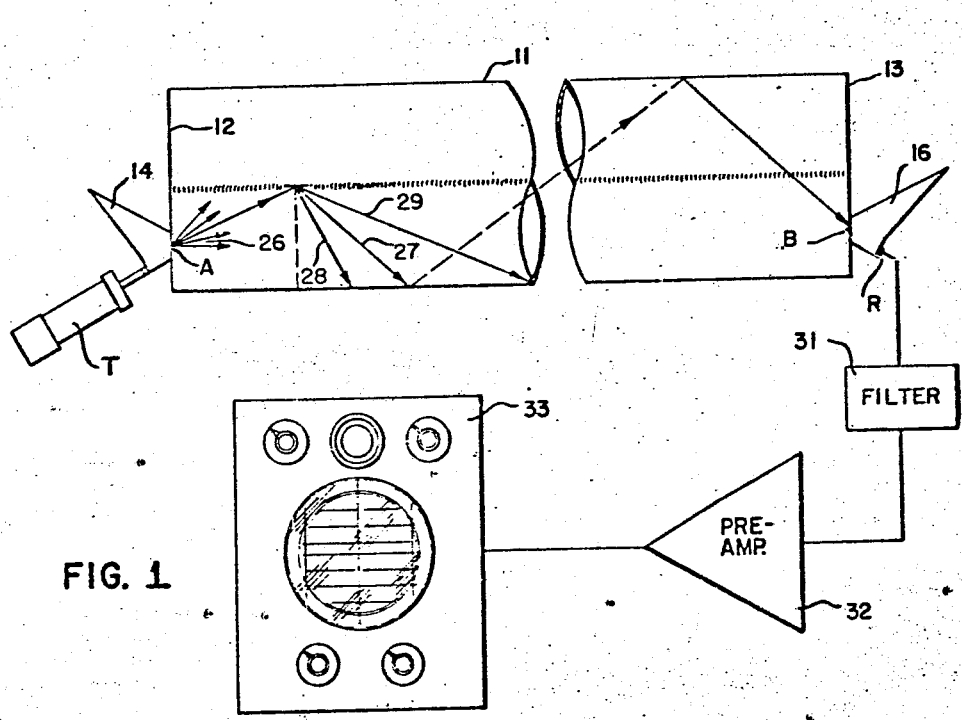
Figure 2A:
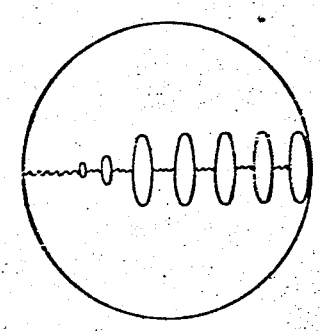
Figure 2B:
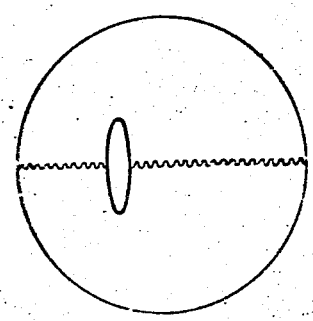

Referring to the drawings:
FIGURE 1 is an illustration of apparatus incorporating our invention for practicing our method.
FIGURE 2A is a schematic view of the presentation on the oscilloscope when the ultrasonic wave train is received after it has reflected from a flaw.
FIGURE 2B is a schematic view of the presentation received on the oscilloscope when a band pass filter is used.

My apparatus for generating ultrasonic waves as used in the nondestructive testing of tubular bodies of members or for system performance monitoring is shown in FIGURE 1. In FIGURE 1, there is provided a tubular member of pipe 11 to be tested. As described in copending application Serial No. 151,331, filed November 9, 1961, now Patent No. 3,186,216, the pipe 11 can be provided with adequately smooth ends or sides 12 and 13. Transmit and receive offsets or wave directors (sonic coupling devices) 14 and 16 are mounted on the ends of the pipe 11 as also described in copending application Serial No. 151,331, filed November 9, 1961, now Patent No. 3,186,216. Alternatively, as disclosed in said copending application wave directors can be mounted on the side wall of the tubular member.

Means is provided for creating wide frequency band impulsively generated sound which can take any suitable form as, for example, a powder actuated gun T shown in the drawing. This powder actuated gun can be of any suitable type such as Model No. 238-M manufactured by Ramset Corporation. The powder actuated gun T is utilized for creating shock waves or sound waves which impinge upon the wave director 14 to cause ultrasonic wave trains to be produced in the wave director 14. The ultrasonic or high frequency sound waves can be readily created by the gun T. For example, the explosion of the powder load only will create gun shock waves that will impinge on the wave director 14 and thus excite it sonically. The desired high frequency sound waves can be created with greater intensity by adding a solid projectile or slug that will strike the metal wave director 14 after firing the gun, thus creating an intense wide band impulsive excitation in the metal.

These wide frequency band impulsively generated sound waves are created by the gun T within the wave director 14. For example, with such a gun, a frequency range from less than 1 mc. to more than 3.0 mc. can be readily obtained. Also, there is a distribution of the high intensity wave trains throughout this wide frequency spectrum.

The ultrasonic wave trains which are introduced into the transmit wave director 14 are introduced into the end or side of the pipe 11 at a predetermined orientation with respect to the longitudinal axis of the tubular body 11. As disclosed in copending application Serial No. 151,331, filed November 9, 1961, now Patent No. 3,186,216, a substantially uncollimated angularly diverging group of helical, ultrasonic wave trains, all of which are of a single hand or helical path rotational direction, represented by the arrows 26 are introduced into the end or side of the pipe and propagate in a direction which is away from the transmit wave director 14 and follow helical paths around and longitudinally within the wall of the pipe toward the other end of the pipe. If it is assumed that a flaw C is present in the pipe, wave trains will be reflected by the flaw C as indicated by the rays such as 27, 28, and 29, which travel in a direction opposite in hand or helical path rotational direction to the direction travelled by the transmitted ultrasonic wave trains 26.

The reflected wave trains 27, 28, and 29, set up a number of angularly dispersed helices, the number of helical loops between C and the right end 13 of pipe 11 being determined by the angle with respect to the longitudinal axis of the pipe 11. At least one of the wave trains 27 is oriented in such a manner that after a partial loop, a complete loop, or several complete helical loops around the pipe, it enters the receiving transducer wave director 16 as shown and is detected by a receive transducer R. In any tubular object, the ultrasonic wave trains interact with the pipe wall as described in copending application Serial No. 228,894, filed October 8, 1962. The result is that the tubular object acts like a mechanical comb filter with selectively passed sonic frequency bands. The particular frequency bands which are passed are a function of pipe wall thickness and other interference effects. The output of the receive transducer R is connected to a filter 31. The output of the filter is connected to a preamplifier 32 which has a relatively high gain with a broad band pass. The output of the amplifier 32 is connected to suitable display means such as an oscilloscope e.g. 33, Tektronix Model 516. The filter 31 selectively reduces signals of all frequencies except a certain desired narrow band and, therefore, serves as a narrow band pass filter.

Operation of this apparatus for use in nondestructive testing or system performance monitoring is very similar to that described in copending application Serial No. 151,331, filed November 9, 1961, now Patent No. 3,136,216. When there is no flaw in the pipe, nothing will be received by the receive transducer R. Therefore, there will be no presentation on the oscilloscope 33. However, when there is a flaw, a presentation will occur on the oscilloscope 33. When there is no filter utilized, a schematic presentation of the display is shown in FIGURE 2A. This presentation is generally determined by mechanical filtering and interference characteristics of the pipe and by the over-all band pass characteristics of the system. If a narrow pass filter is utilized, the presentation is schematically of the type shown in FIGURE 2B on the oscilloscope 33. Thus, it can be seen that signals which are particularly adapted for flaw indication information can be readily obtained.

Although I have primarily discussed the use of explosives for creating the wide frequency band impulsively generated sound because they are relatively simple and inexpensive to use, it is readily apparent that, if desired, electrical, electromechanical, hydraulic, and pneumatic devices can be utilized to create a burst of ultrasound of the wide frequency band within the member to be tested. Thus, it is possible to use a solenoid actuated device, an air hammer or an hydraulically operated hammer which will strike a blow and then be removed so that ultrasonic wave trains are created. Repetitive blows may also be struck with such devices to provide repetitive signals to pulse modulate the shock-excited ultrasonic wave trains. Alternatively, a pulsed electric arc may be similarly used to create a shock wave in a gas such as air which impinges on a wave director and in turn results in a burst of ultrasound within the object. These techniques make it possible to transmit information on such wave trains and also makes it possible to distinguish such wave trains from ultrasonic noise.

Because of the high intensity of the ultrasonic wave trains introduced, the wave trains can be transmitted over relatively great distances through relatively long lengths of tubular members or other objects with relatively great physical separation between the point of introduction of the wave train and the point of recepit of the wave train while still obtaining suitable signals at the receive transducer. This high intensity also makes it possible to use a single pulse for flaw detection because of the positive indication given. Mechanical discrimination by proper positioning of the receive transducer as described in copending application Serial No. 151,331, filed November 9, 1961, now Patent No. 3,186,216, can be used to sense only helical waves and to eliminate or minimize or in other words discriminate against ultrasonic noise (random undirected signals) or other spurious background noise which may be generated in certain environments such as in drill pipe during drilling operations.

Although I have shown the wave trains being introduced so that they travel in helical paths, it is readily apparent that such ultrasonic wave trains can be utilized which do not travel in helical paths in tubular or other geometries such as flat plates as disclosed in copending application Serial No. 228,894, filed October 8, 1962.

It is also apparent from the foregoing that I have provided apparatus for generating ultrasonic wave trains which is relatively inexpensive and which is particularly adapted for field use.

I claim:

1. In apparatus for ultrasonically inspecting a member to be tested, said member being capable of carrying ultrasonic wave trains, a gun adapted to actuate an explosive charge for generating sound energy having a large component of the same lying in the frequency band above one megacycle and of high intensity, and means operatively connected to said member for coupling said sound energy into the member to be tested and to cause ultrasonic wave trains to be formed within the member and to travel through the member.

2. Apparatus as in claim 1 wherein the sound waves are generated by a slug fired from said gun, said slug impinging directly upon said means operatively coupling said sound energy into the member to be tested.

3. Apparatus as in claim 2 wherein said coupling said sound energy into the member includes a rigid metal element having a surface upon which the slug is adapted to impinge and having an additional surface in intimate contact with said member.

References Cited by the Examiner

UNITED STATES PATENTS

| | | | |
|---|---|---|---|
| 2,601,779 | 7/1952 | Firestone | 73—67.8 |
| 2,612,772 | 10/1952 | McConnell | 73—67.5 |
| 2,664,850 | 1/1954 | Smith | 116—137 |
| 2,715,384 | 8/1955 | Meng | 116—137 |
| 2,804,042 | 8/1957 | Gavreau | 116—137 |
| 2,932,189 | 4/1960 | Carlin | 73—67.7 |
| 2,946,217 | 7/1960 | Fruengel | 73—67.5 |
| 3,066,525 | 12/1962 | Harris | 73—67.8 |
| 3,121,324 | 2/1964 | Cowan | 73—67.5 |
| 3,166,931 | 1/1965 | Renaut et al. | 73—67.8 |

FOREIGN PATENTS

| | | |
|---|---|---|
| 765,906 | 1/1957 | Great Britain. |

RICHARD C. QUEISSER, *Primary Examiner.*

JOHN P. BEAUCHAMP, *Assistant Examiner.*